United States Patent
Kagawa et al.

(10) Patent No.: US 12,073,543 B2
(45) Date of Patent: Aug. 27, 2024

(54) APPARATUS, METHOD, AND STORAGE MEDIUM

(71) Applicant: CANON KABUSHIKI KAISHA, Tokyo (JP)

(72) Inventors: Hidetsugu Kagawa, Kanagawa (JP); Tetsuya Suwa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 133 days.

(21) Appl. No.: 17/674,701

(22) Filed: Feb. 17, 2022

(65) Prior Publication Data

US 2022/0270220 A1    Aug. 25, 2022

(30) Foreign Application Priority Data

Feb. 25, 2021    (JP) .................................. 2021-028709

(51) Int. Cl.
*G06T 5/90*    (2024.01)
*G06V 10/60*    (2022.01)

(52) U.S. Cl.
CPC ................ *G06T 5/90* (2024.01); *G06V 10/60* (2022.01); *G06T 2207/20208* (2013.01); *G06T 2207/30196* (2013.01)

(58) Field of Classification Search
CPC ........... G06T 5/007; G06T 2207/20208; G06T 2207/30196; G06V 10/60; G06V 40/162
See application file for complete search history.

(56) References Cited

U.S. PATENT DOCUMENTS

2019/0364171 A1* 11/2019 Suwa .................. H04N 1/4074

FOREIGN PATENT DOCUMENTS

JP    2011086976 A    4/2011

OTHER PUBLICATIONS

Ortiz-Jaramillo, B., Kumcu, A., Platisa, L. and Philips, W., 2018. Content-aware contrast ratio measure for images. Signal Processing: Image Communication, 62, pp. 51-63.*
Cheng, M.M., Mitra, N.J., Huang, X., Torr, P.H. and Hu, S.M., 2014. Global contrast based salient region detection. IEEE transactions on pattern analysis and machine intelligence, 37(3), pp. 569-582.*

* cited by examiner

*Primary Examiner* — Zhitong Chen
(74) *Attorney, Agent, or Firm* — Canon U.S.A., Inc. IP Division

(57) ABSTRACT

Due to the influence of luminance contrast between objects, the luminance of each object may be perceived as being different from the actual luminance, and a difference may occur between the appearance of an output based on input image data having a wide luminance range when the output is observed and the appearance of an output based on output image data having a narrow luminance range when the output is observed. The contrast intensity between the objects is calculated, and a dynamic range compression process is performed based on the calculated contrast intensity, so that it is possible to reduce the difference in appearance due to the influence of luminance contrast.

19 Claims, 15 Drawing Sheets

FIG.2A
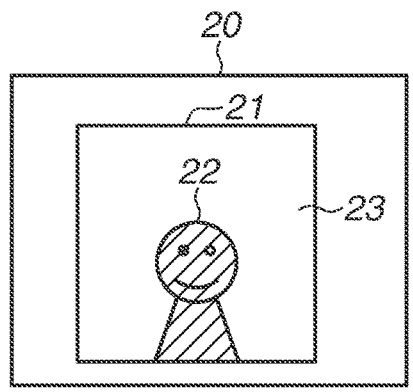
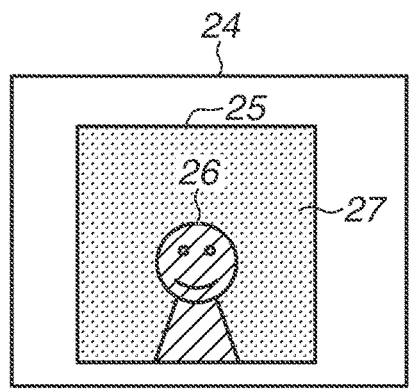
FIG.2B
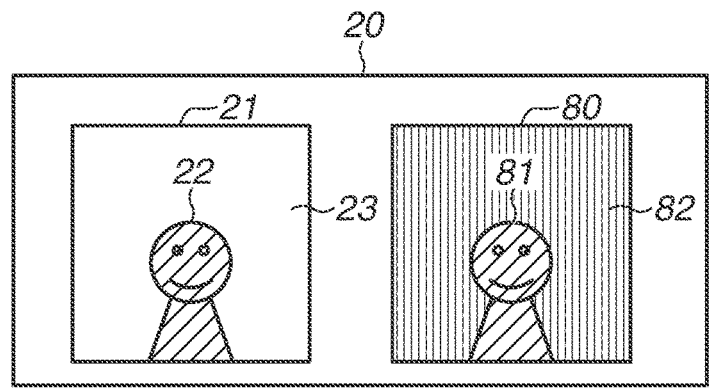
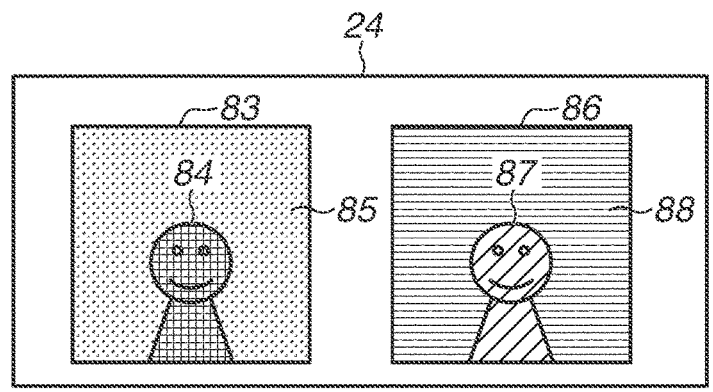

APPARATUS, METHOD, AND STORAGE MEDIUM

BACKGROUND

Field of the Disclosure

The aspect of the embodiments relates to an image processing apparatus, an image processing method, and a storage medium for generating output image data having a narrower luminance range than that of input image data.

Description of the Related Art

A high-dynamic-range (HDR) content having a reproduction range with a high luminance and a wide color gamut has become prevalent. In the HDR content, high-quality image representation is performed using a wide luminance range with the highest luminance of 1000 nits (1000 cd/m2) or more. The HDR content is displayed on an HDR display compatible with a standard such as HDR10, so that it is possible to check data with a high luminance and a wide color gamut in the content.

In contrast, a luminance range represented by conventional sRGB or Adobe RGB is about 80 to 120 nits. Content represented in such a conventional luminance range is termed a standard-dynamic-range (SDR) content. The SDR content is displayed on an SDR display compatible with sRGB and/or Adobe RGB, so that it is possible to check the SDR content. The SDR content can also be displayed in the luminance range of SDR on an HDR display.

To display HDR image data on an SDR display or record HDR image data using a recording apparatus, dynamic range (hereinafter referred to as "D-range") compression using a tone curve and the like is to be performed so that the HDR image data has the D-range of a luminance that can be reproduced by each device.

Japanese Patent Application Laid-Open No. 2011-86976 discusses image processing for correcting a reduction in contrast when D-range compression is performed using a single tone curve.

When image data is displayed on a display and checked, the brightness of the image data may be perceived as being different from the brightness of the original data, depending on the scene.

In particular, an HDR image is represented with a luminance higher than that of a conventional SDR image, so that the influence of luminance contrast on the HDR image is great. For example, in a case where in the HDR image, the luminance value of a background is high and is greatly different from the luminance value of a person, the luminance of the person is perceived as being darker than the actual luminance value. Thus, between the HDR image in which the influence of luminance contrast is great and the SDR image in which the influence of luminance contrast is small, even if the luminance value has the same brightness, the appearance may differ depending on the degree of influence of luminance contrast.

SUMMARY OF THE DISCLOSURE

According to an aspect of the embodiments, an apparatus includes an acquisition unit configured to acquire information indicating a first object and a second object among a plurality of objects included in input data having a first range, a calculation unit configured to calculate, based on the acquired information, an intensity indicating a degree of contrast between a brightness of the first object and a brightness of the second object, and a generation unit configured to generate output data having a second range narrower than the first range by converting luminance values of pixels in the input data, based on the calculated intensity. In a case where the calculated intensity is a first intensity, the generation unit generates the output data so that a difference between a luminance of the first object and a luminance of the second object in the output data is a first value. In a case where the calculated intensity is a second intensity indicating that influence of contrast is greater than influence of contrast of the first intensity, the generation unit generates the output data so that the difference between the luminance of the first object and the luminance of the second object in the output data is a second value greater than the first value.

Further features of the disclosure will become apparent from the following description of exemplary embodiments with reference to the attached drawings.

BRIEF DESCRIPTION OF THE DRAWINGS

FIGS. 2A and 2B are diagrams illustrating a difference in appearance between a high-dynamic-range (HDR) display and a standard-dynamic-range (SDR) display.

DESCRIPTION OF THE EMBODIMENTS

A first exemplary embodiments of the disclosure will be described below with reference to the accompanying drawings.

(Description of System Configuration)

Figure 1:
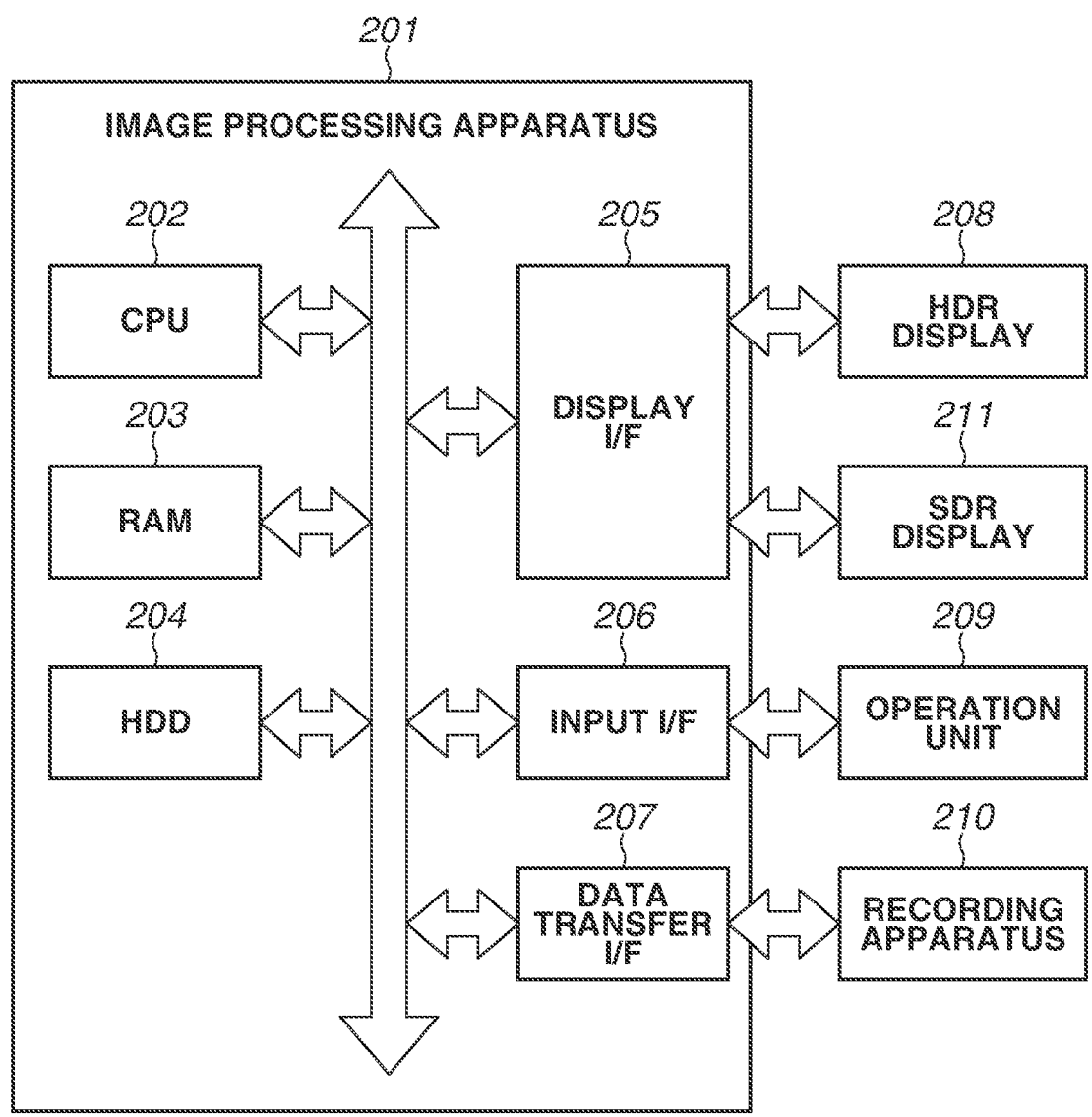
FIG. 1 is a diagram illustrating an example of a hardware configuration of a system.

FIG. 1 is a diagram illustrating an example of the configuration of a system according to the first exemplary embodiment. For example, this system includes an image processing apparatus 201 and a recording apparatus 210. This configuration is merely an example, and an apparatus other than these apparatuses may be included. A form may be employed in which a plurality of apparatuses illustrated in FIG. 1 is integrated into a single apparatus, for example, by incorporating the image processing apparatus 201 into the recording apparatus 210. Each block included in each apparatus may be divided into a plurality of blocks, and a single block including a plurality of blocks may be used.

The image processing apparatus 201 is, for example, a host personal computer (PC). The image processing apparatus 201 includes a central processing unit (CPU) 202, a random-access memory (RAM) 203, a hard disk drive (HDD) 204, a display interface (I/F) 205, an input I/F 206, and a data transfer I/F 207. These components are connected together via an internal bus so that the components can communicate with each other.

According to a program held in the HDD 204, the CPU 202 executes various processes.

At this time, the RAM 203 is used as a work area. The CPU 202 is an example of a processor, and other processors may be used. For example, other processors, such as a graphics processing unit (GPU) and a digital signal processor (DSP), may be additionally or alternatively used. Some or all of the processes executed by the CPU 202 may be executed by a hardware device capable of executing the processes, such as an application-specific integrated circuit (ASIC) or a field-programmable gate array (FPGA). The RAM 203 is a volatile storage area and is used as a work memory. The HDD 204 is a non-volatile storage area and holds a program according to the present exemplary embodiment and an operating system (OS). The display I/F 205 is an interface for transmitting and receiving data to and from a high-dynamic-range (HDR) display 208 or a standard-dynamic-range (SDR) display 211. The input I/F 206 is an interface, such as an external keyboard, a pointing device, and a touch panel, that receives information input from a device that receives a user operation and outputs information indicating the user operation. The keyboard may be a keyboard (not illustrated) included in the image processing apparatus 201. The data transfer I/F 207 is an interface for transmitting and receiving data to and from the recording apparatus 210.

In accordance with an instruction (a command) from a user through an operation unit 209 and/or a program held in the HDD 204, the CPU 202 generates image data that is recordable by the recording apparatus 210, and then transfers the image data to the recording apparatus 210. In the present exemplary embodiment, the recording apparatus 210 is a recording apparatus using an inkjet recording method, but is not limited to this. For example, the recording apparatus 210 may be a recording apparatus using an electrophotographic method.

The connection method for connecting the display I/F 205 of the image processing apparatus 201 is not particularly limited. For example, High-Definition Multimedia Interface (HDMI) (registered trademark) or DisplayPort can be used.

The connection method for connecting the data transfer I/F 207 of the image processing apparatus 201 is not particularly limited. For example, Universal Serial Bus (USB) or the Institute of Electrical and Electronics Engineers (IEEE) 1394 can be used. It does not matter whether the connection is wired or wireless.

FIGS. 2A and 2B are diagrams illustrating differences in appearance between the HDR display 208 and the SDR display 211. An "HDR image" refers to an image on which image data has a wide dynamic range. An "SDR image" refers to an image on which image data has a narrow dynamic range. As typified by Adobe RGB, a typical SDR image has a dynamic range in which the highest luminance is represented by a brightness of about 120 nits. In contrast, the highest luminance of an HDR image is brighter than that of the SDR image, and the HDR image has a wider dynamic range than that of the SDR image. For example, the DisplayHDR 400 standard defines that the highest luminance is 400 nits.

FIG. 2A illustrates the state where an HDR image 21 is displayed on a display portion 20 of the HDR display 208, and an SDR image 25 is displayed on a display portion 24 of the SDR display 211. In a center portion of the HDR image 21, a person 22, serving as a main object, indicated by oblique lines is displayed, and the brightness of the person 22 is 80 nits. As a background object of the person 22, a sky 23 on a sunny day is displayed, and the brightness of the sky 23 is 1000 nits.

In an image in such a scene, since the person 22 is surrounded by the bright sky 23, a phenomenon occurs where the brightness of the person 22 and the brightness of the sky 23 contrast with each other. A "contrast phenomenon" refers to a phenomenon where the bright sky 23 is adjacent to the person 22, so that the brightness of the person 22 is perceived as being darker than the brightness in the actual data (80 nits). This contrast phenomenon is generally termed brightness contrast or luminance contrast.

On the other hand, the SDR image 25 is an image generated by compressing the HDR image 21 into the dynamic range of SDR. A method for this dynamic range compression process will be described below.

Figure 3:
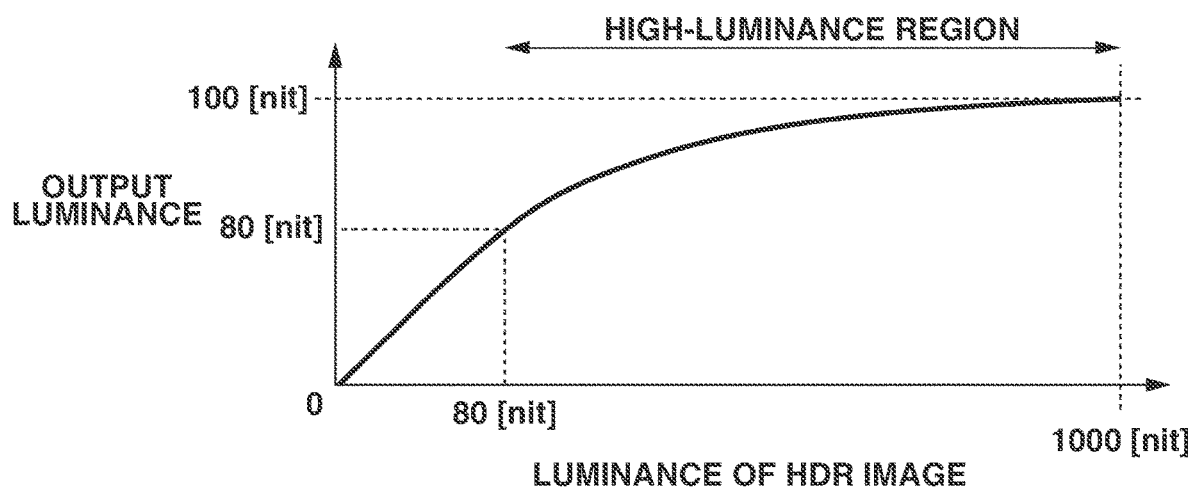
FIG. 3 is a diagram illustrating dynamic range (D-range) compression through a conventional technique.

FIG. 3 is a diagram illustrating the dynamic range compression method. In the dynamic range compression process, the contrast of a region having a bright luminance is reduced. In FIG. 3, the range of input luminances from 0 to 80 nits corresponds to the range of output luminances from 0 to 80 nits, and the range of input luminances from 80 to 1000 nits corresponds to the range of output luminances from 80 to 100 nits.

Referring back to FIG. 2A, a person 26 in the SDR image 25 is surrounded by a sky 27, which has been compressed into the range of SDR. The brightness of the person 26 is 80 nits, and the brightness of the sky 27 is 100 nits. The difference between the brightness of the sky and the brightness of the person is smaller in the SDR image 25 than in the HDR image 21. Thus, in the appearance of the SDR image 25 in a case where the SDR image 25 is observed, luminance contrast is small unlike a case where the HDR image 21 is observed. Thus, the brightness of the person 26 is perceived as being close to the original brightness.

It is known that luminance contrast that causes brightness to be perceived as being different from the original brightness results from lateral inhibition in the retina. The higher the luminance is, the more strongly the lateral inhibition acts. Thus, an HDR image having a luminance far higher than that of an SDR image is greatly influenced by lateral inhibition. In a case where an HDR image including a main object and a background object is observed, the difference in luminance between the main object and the background object is perceived as being different from the original difference in luminance under the influence of luminance contrast.

FIG. 2B is a diagram illustrating an SDR image received in the configuration of the present exemplary embodiment.

The HDR image 21 and an HDR image 80 are displayed on the display portion 20 of the HDR display 208, and an SDR image 83 and an SDR image 86 are displayed on the display portion 24 of the SDR display 211. The scene of the HDR image 21 is similar to that in FIG. 2A. The scene of the HDR image 80 is different from that of the HDR image 21, and the brightness of a sky 82 is 200 nits. The brightness of a person 81 is 80 nits, which is the same brightness as that of the person 22. In the scene of the HDR image 80, since the brightness of the sky 82 is darker than the brightness of the sky 23, the influence of luminance contrast that occurs between the sky 82 and the person 81 is smaller than the influence of luminance contrast that occurs between the person 22 and the sky 23 in the scene of the HDR image 21. Thus, even if pieces of data on the person 22 and the person 81 have the same brightness, the person 22 is perceived as being darker.

Next, by the compression method according to the present exemplary embodiment, image data on the SDR image 83 is generated from image data on the HDR image 21, and image data on the SDR image 86 is generated from image data on the HDR image 80.

The sky 82 having a brightness of 200 nits in the HDR image 80 is converted to a sky 88 having a brightness of 90 nits by dynamic range compression, and the person 81 is converted to a person 87 while maintaining a brightness of 80 nits.

In contrast, the influence of luminance contrast is greater in the HDR image 21 than in the HDR image 80. Thus, the sky 23 having a brightness of 1000 nits is converted to a sky 85 having a brightness of 100 nits, and the person 22 having a brightness of 80 nits is converted to a person 84 having a brightness of 70 nits. This derives from the fact that in an SDR image generated by compressing the dynamic range of an HDR image in which the influence of luminance contrast is great, the influence of luminance contrast decreases.

In other words, if the brightness of the person 22 which has a brightness of 80 nits in the HDR image 21 is set to a brightness of 80 nits in the SDR image after the compression, the influence of luminance contrast weakens, and the brightness of the person after the compression is perceived as being brighter than the brightness of the person 22 in the original HDR image 21. Thus, in the dynamic range compression process according to the present exemplary embodiment, in the SDR image 83 obtained by compressing the HDR image 21, the brightness of the person 84 is set to 70 nits. This can match the appearances of the person 22 in the HDR image 21 and the person 84 in the SDR image 83.

As described above, in the present exemplary embodiment, in generating an SDR image by compression of an HDR image, a difference in luminance between the objects in the SDR image to be generated is changed in accordance with the degree of luminance contrast occurring between two objects included in the HDR image. Thus, even if either of the objects has the same brightness in the HDR image, the difference in luminance between the objects in the SDR image to be generated is made greater in a scene where the influence of luminance contrast is strong than in a scene where the influence of luminance contrast is small.

The dynamic range compression method which is a characteristic configuration of the present exemplary embodiment will be described in detail below.

Figure 4:
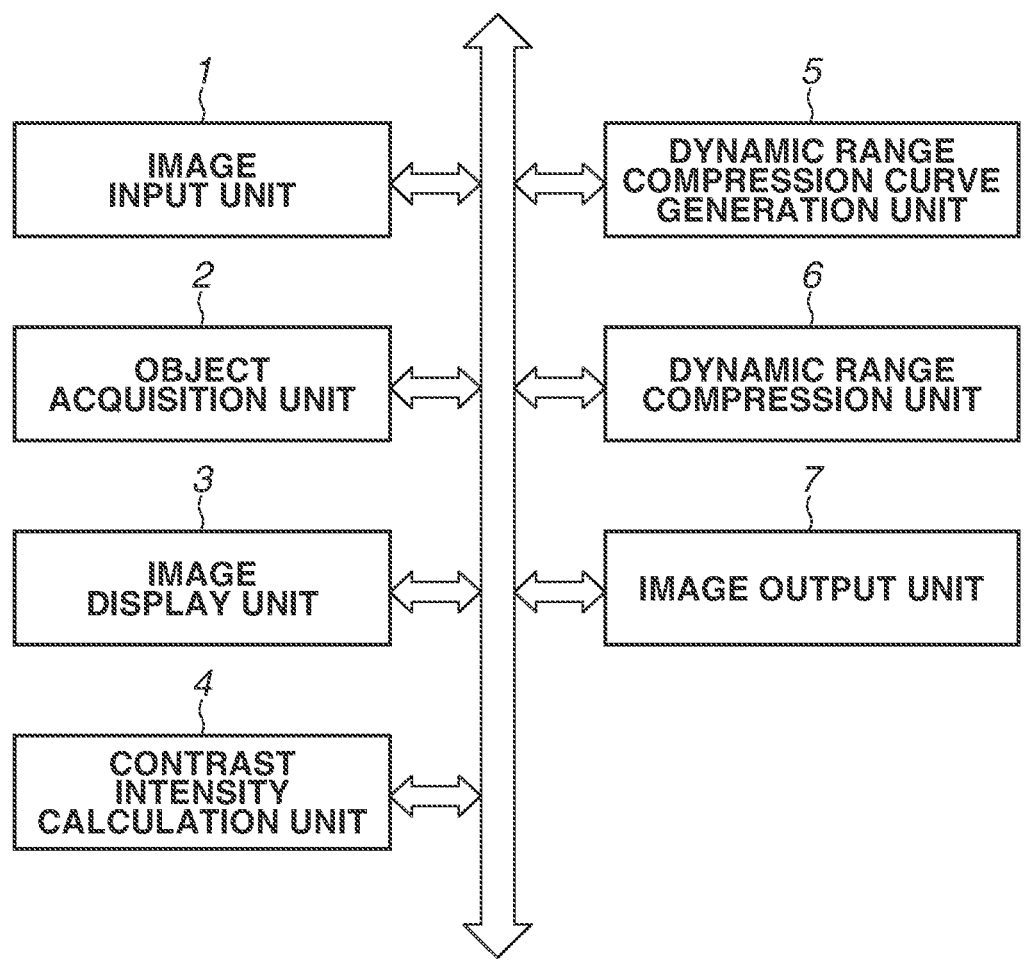
FIG. 4 is a diagram illustrating a software configuration regarding a D-range compression process according to a first exemplary embodiment.

FIG. 4 is a diagram illustrating an example of a software configuration for performing dynamic range compression when HDR image data is printed by the recording apparatus 210. In the present exemplary embodiment, the software configuration is implemented by the CPU 202 reading and executing a program stored in the HDD 204. The image processing apparatus 201 includes an image input unit 1, an object acquisition unit 2, an image display unit 3, a contrast intensity calculation unit 4, a dynamic range compression curve generation unit 5, a dynamic range compression unit 6, and an image output unit 7. The configuration illustrated in FIG. 4 illustrates components related to processing regarding dynamic range compression, and the image processing apparatus 201 may further include a component that performs another type of image processing.

Figure 5:
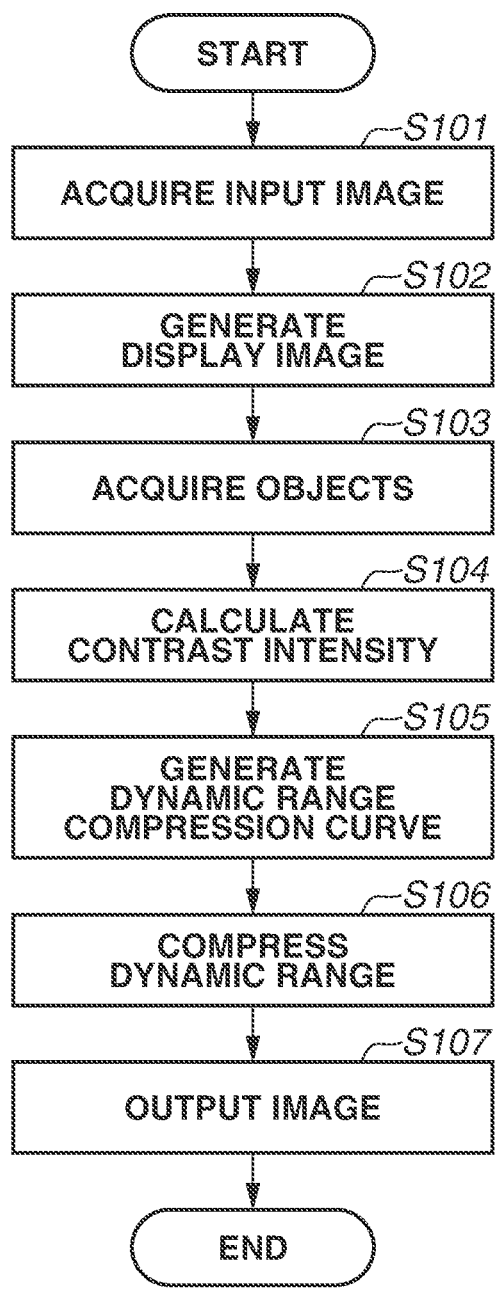
FIG. 5 is a flowchart illustrating the D-range compression process according to the first exemplary embodiment.

FIG. 5 is a flowchart illustrating the processing performed by the software configuration in FIG. 4. An example will be described where output image data to be recorded by the recording apparatus 210 is generated based on HDR image data, which is input image data.

In step S101, the image input unit 1 acquires HDR image data. As an acquisition method for acquiring the HDR image data, image data held in the HDD 204 may be acquired, or image data may be acquired from an external apparatus via the data transfer I/F 207.

In the present exemplary embodiment, a description will be provided of taking red, green, and blue (RGB) data having a dynamic range where the maximum luminance is 1000 nits, as an example of the HDR image data.

Figure 6:
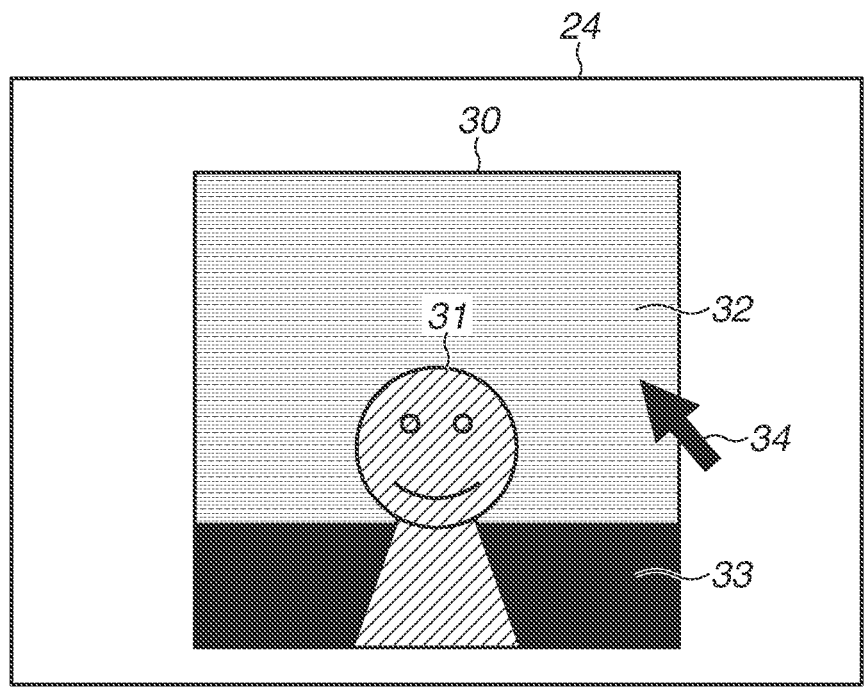
FIG. 6 is a diagram illustrating an object acquisition method according to the first exemplary embodiment.

In step S102, the image display unit 3 generates SDR image data to be displayed as an SDR image on the SDR display 211 based on the HDR image data input in step S101. For the luminance of the HDR image data, the SDR image data is generated using a single tone curve for association of a maximum input luminance of 1000 nits with a maximum output luminance of 100 nits, as illustrated in FIG. 3. FIG. 6 is a diagram illustrating the state where the generated SDR image data is displayed as an SDR image 30 on the display portion 24 of the SDR display 211.

In step S103, the object acquisition unit 2 receives information regarding an operation performed on the operation unit 209 by the user. The object acquisition unit 2 associates the received information with the SDR image 30, thus acquiring information indicating objects selected by the user. As a method for extracting the object information from the image data, a method for dividing the image data into a plurality of regions is used. For example, using simple linear iterative clustering (SLIC), the image data can be divided into regions such that regions where the colors of pixels included in images are close to each other or pixels included in the images are at a close distance from each other are included in the region of the same object. The division method for dividing objects is not limited to SLIC, and may be a method for dividing objects using machine learning. The user operates a cursor 34 through the operation unit 209 such as a mouse, thus selecting an object as a main object included in the SDR image 30 and a background object contrasting with the main object.

The SDR image 30 is an image including a plurality of object images, such as a person 31, a sky 32, and a sea 33. For example, in a case where the user moves the cursor 34 and selects the region of the person 31 with an operation such as a click of the mouse, the object acquisition unit 2 receives information indicating that region of the person 31 is selected. As the acquisition method for acquiring regions of objects, the user may be prompted to select an object through the display portion 24 that displays message dialogs. For example, a message prompting the user to select a main object is displayed, a selection operation is received from the user, a message prompting the user to select the background object is then displayed, and a selection operation is received from the user, thus acquiring the regions of objects of the image. Alternatively, a method for receiving a plurality of selection operations from the user and acquiring each of the selection operations as information indicating a selected object may be used. Yet alternatively, information indicating that the user selects three or more objects may be received.

Figure 7:
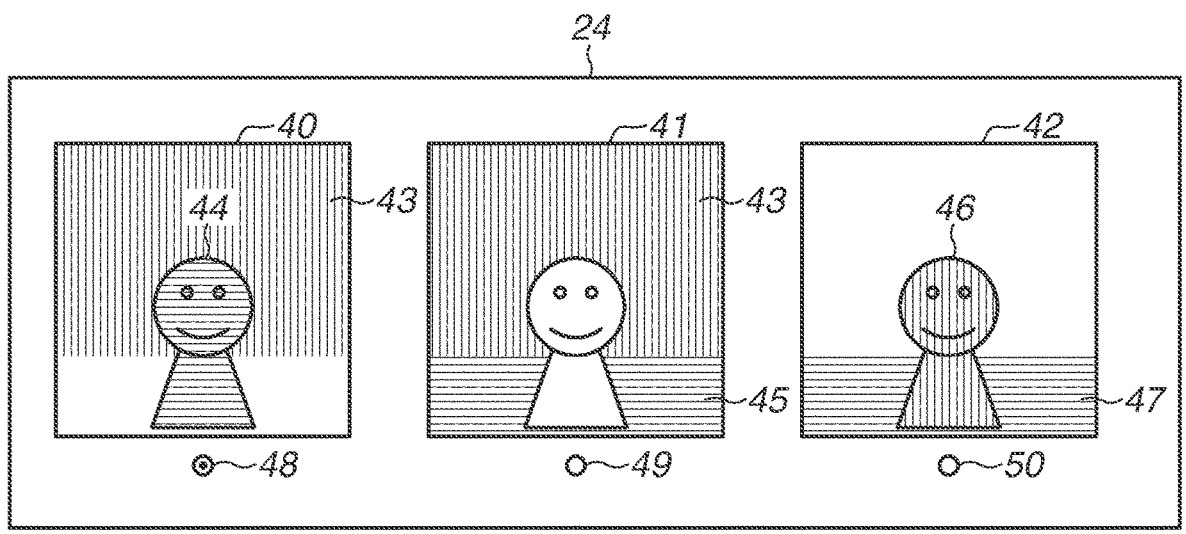
FIG. 7 is a diagram illustrating an object acquisition method in a case where a plurality of images is displayed according to the first exemplary embodiment.

FIG. 7 is a diagram illustrating another method for receiving a selection operation from the user using the display portion 24. The method for dividing the SDR image 30 into objects is similar to the above method, and thus is not described. The display portion 24 displays selection SDR images 40 to 42 and radio buttons 48 to 50. The generation method for generating the selection SDR images 40 to 42 will be described.

Initially, two objects are selected from among a plurality of divided objects. Between the selected two objects, the object having the lower average luminance is set to the main object, and the object having the higher average luminance is set to a background object. If three objects are included in the SDR image 30, there are three combinations in which two objects are selected from the three objects.

These three combinations correspond to the selection SDR images 40 to 42. In the selection SDR image 40, a person 44 is set to the main object, and a sky 43 is set to the background object. Similarly, in the selection SDR image 41, a sea 45 is set to the main object, and the sky 43 is set to the background object. In the selection SDR image 42, a sea 47 is set to the main object, and a person 46 is set to the background object.

In each of the selection SDR images 40 to 42, the colors of regions set to the main object and the background object are replaced with highlight colors indicating the main object and the background object. For example, for the main object, green represented by (R, G, B)=(0, 255, 0) is used. For the background object, blue represented by (R, G, B)=(0, 0, 255) is used. The colors to replace the main object and the background object are not limited to these colors, and a combination of other colors such as black and white may be used. Instead of replacing the main object and the background object with the highlight colors, a method for changing the contrast of the SDR image 30 may be used.

Figure 8A:
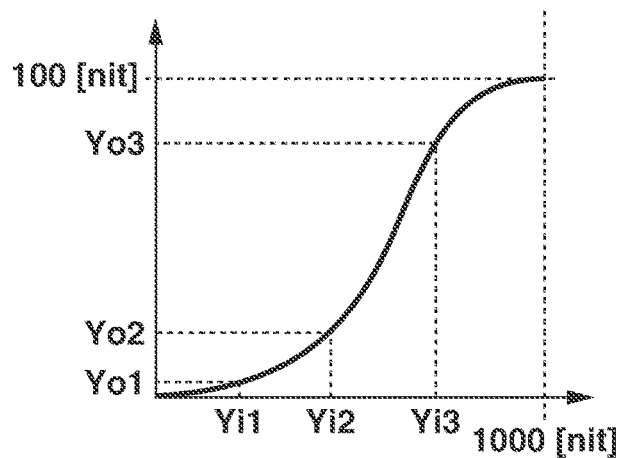
FIGS. 8A to 8C are diagrams illustrating D-range compression curves for generating the plurality of images according to the first exemplary embodiment.
Figure 8B:
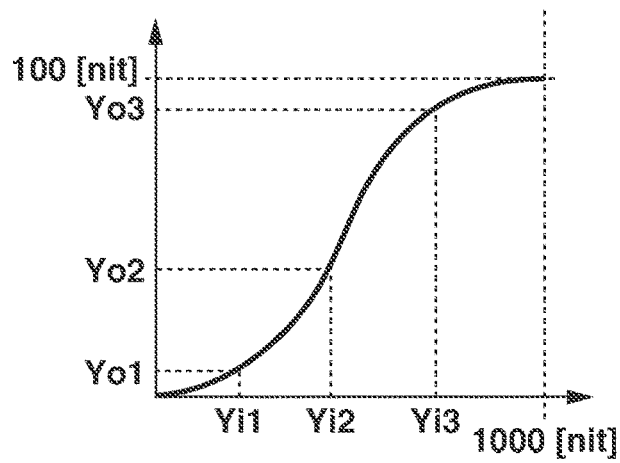
Figure 8C:
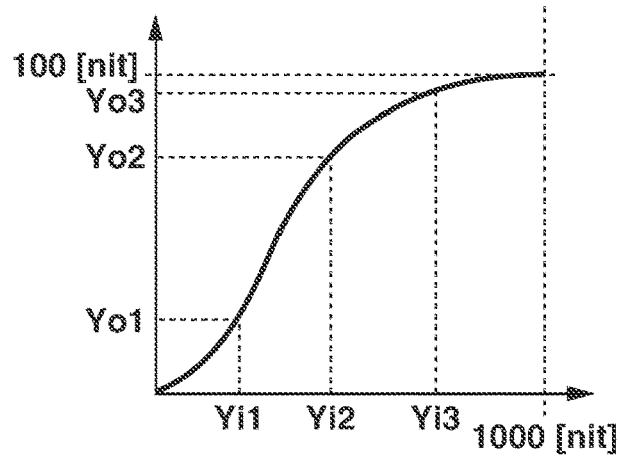

FIGS. 8A to 8C are diagrams illustrating dynamic range compression curves to be used in the compression process for the HDR image data. FIGS. 8A to 8C correspond to dynamic range compression curves used for generating the selection SDR images 40 to 42, respectively, from the HDR image. In FIGS. 8A to 8C, Yi1, Yi2, and Yi3 indicate the input luminances of the sea object, the person object, and the sky object, respectively, and Yo1, Yo2, and Yo3 indicate the output luminances of the sea object, the person object, and the sky object, respectively.

These dynamic range compression curves are set so that the difference in output luminance between the main object and the background object increases. For example, in the selection SDR image 40, the person is set to the main object, the sky is set to the background object, and the dynamic range compression curve in FIG. 8A is used. The dynamic range compression curve in FIG. 8A is set so that the difference between the output luminance Yo2 of the person and the output luminance Yo3 of the sky is greater than those in FIGS. 8B and 8C. Similarly, in the selection SDR image 41, the dynamic range compression curve in FIG. 8B is used. The dynamic range compression curve in FIG. 8B is set so that the difference in luminance between the output luminances Yo1 and Yo3 is greater than those in FIGS. 8A and 8C. Similarly, in the selection SDR image 42, the dynamic range compression curve in FIG. 8C is used. The dynamic range compression curve in FIG. 8C is set so that the difference in luminance between the output luminances Yo1 and Yo2 is greater than those in FIGS. 8A and 8B.

As described above, the selection SDR images 40 to 42 are generated so that the difference in luminance between two objects in a certain combination selected as the main object and the background object from among three or more objects is greater than the difference in luminance between the two objects in a case where another combination is selected. In other words, in a case where a combination of objects A and B is selected, the difference in luminance between the objects A and B is greater than the difference in luminance between the objects A and B in a case where another combination (e.g., the object B and an object C) is selected.

The generated selection SDR images 40 to 42 are each displayed on the display portion 24. The radio buttons 48 to 50 corresponding to the displayed images are displayed. The object acquisition unit 2 acquires information regarding any one of the radio buttons 48 to 50 selected by the user and acquires the main object and the background object corresponding to the acquired information. As described above, in the method for acquiring information regarding an image selected from among a plurality of displayed selection SDR images, a single pair can be determined for a combination indicating the main subject and the background object. Determining a single pair for a combination of objects enables reduction in the load of calculating a contrast intensity Vc.

(Calculation Method for Calculating Contrast Intensity Vc)

Referring back to FIG. 5, in step S104, the contrast intensity calculation unit 4 calculates a contrast intensity Vc indicating the degree of contrast of brightness based on the information regarding the objects acquired by the object acquisition unit 2 in step S103 and the HDR image data acquired in step S101. In the present exemplary embodiment, an example is described in which the contrast intensity Vc is calculated based on a luminance difference Yv, a distance Ds, and an area difference Av.

Initially, the luminance difference Yv is calculated. If the HDR image data is RGB data, the RGB data can be converted to YCbCr data using Equations (1) to (3). The conversion formulas from RGB to YCbCr are merely examples, and other conversion formulas may be used.

$$Y = 0.299 \cdot R + 0.587 \cdot G + 0.114 \cdot B \quad \text{Equation (1)}$$

$$Cb = -0.169 \cdot R - 0.331 \cdot G + 0.5 \cdot B \quad \text{Equation (2)}$$

$$Cr = 0.5 \cdot R - 0.419 \cdot G - 0.081 \cdot B \quad \text{Equation (3)}$$

Regarding each of the plurality of acquired objects, the average of the luminance values of pixels of the object is set to a representative value. The object having the lower luminance is set to the main object, and the luminance of the main object is set to Y1. The object having the higher luminance is set to the background object, and the luminance of the background object is set to Y2. The determination method for determining the representative value is not limited to the above method. Alternatively, a luminance histogram of each object may be calculated, and a maximum luminance in the histogram may be set to the representative value. The luminance difference Yv is calculated from the luminances Y1 and Y2 using Equation (4).

$$Yv = Y2 - Y1 \quad \text{Equation (4)}$$

The luminance difference Yv may be calculated from the ratio between the luminances Y1 and Y2. Equation (5) is a formula for calculating the ratio.

$$Yv = Y2/Y1 \qquad \text{Equation (5)}$$

It is widely known that the amount of human sense of brightness is proportional to the log of brightness according to the Weber-Fechner law. Thus, if the luminance difference Yv is calculated using the ratio as in Equation (5), the relationship of the luminance difference Yv to the amount of change in the difference between the luminances Y1 and Y2 can be brought close to the amount of human sense. It can be assumed that the greater the value of the luminance difference Yv is, the greater the degree of influence of the contrast of the background object to the main object is.

Next, the method for calculating the luminance difference Yv will be described using an example a case in which two objects selected from the plurality of objects acquired by the object acquisition unit 2 are a combination of the main object and the background object, and there is a plurality of combinations of the main object and the background object (N combinations in this case). There is a plurality of combinations of the main object and the background object, and a luminance difference calculated for the respective combinations are Yv1, Yv2, . . . , YvN. The average value of the luminance difference Yv of the luminance differences Yv1 to YvN is obtained by Equation (6).

$$Yv = (Yv1 + Yv2 + \ldots, YvN)/N \qquad \text{Equation (6)}$$

The calculation method for calculating the average value of the luminance difference Yv is not limited to this method, and may be a method for obtaining a maximum value of the luminance differences Yv1 to YvN.

Next, the distance Ds between the main object and the background object is calculated. The distance Ds is the distance between pixels in images of the objects.

Figure 9A:
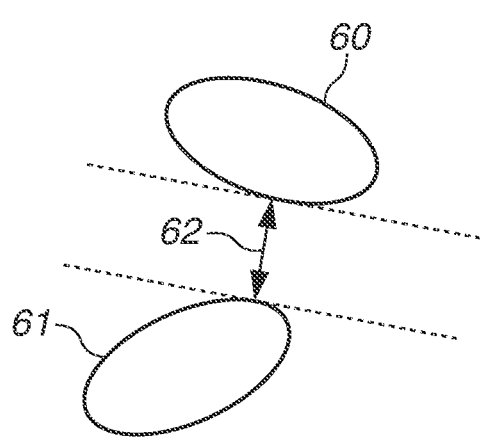
FIGS. 9A and 9B are diagrams illustrating a calculation method for calculating a distance between objects according to the first exemplary embodiment.

FIG. 9A is a diagram illustrating a method for calculating the shortest distance between two objects 60 and 61. The shortest distance 62 between points of tangency among points of tangency tangent to the objects 60 and 61 is the distance Ds. If the objects 60 and 61 are in contact with each other, the difference between pixels of the objects 60 and 61 is one pixel, and thus, Ds=1. The distance Ds does not take a value smaller than 1. The distance Ds is not limited to the shortest distance between the objects 60 and 61, and may be the distance between the centers of gravity of the objects 60 and 61.

Figure 9B:
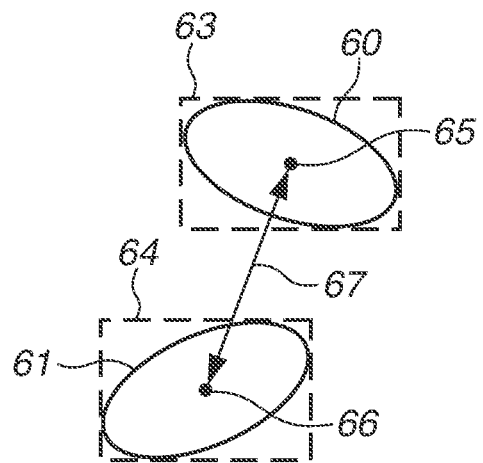

FIG. 9B is a diagram illustrating the method for determining the distance between the centers of gravity of the objects 60 and 61 as the distance Ds.

A rectangle in which the object 60 is inscribed is a rectangle 63, and a rectangle in which the object 61 is inscribed is a rectangle 64. The center of gravity of the rectangle 63 is a center of gravity 65, and the center of gravity of the rectangle 64 is a center of gravity 66. A distance 67 between the centers of gravity 65 and 66 is the distance Ds. It can be assumed that the smaller the value of the distance Ds is, the greater the degree of influence of the contrast of the background object to the main object is. If there are N combinations of the main object and the background object, distances Ds1, Ds2, . . . , DsN are calculated regarding the respective plurality of combinations of the main object and the background object. The average value of the distances Ds1 to DsN is determined to be the distance Ds as expressed in Equation (7).

$$Ds = (Ds1 + Ds2 + \ldots, DsN)/N \qquad \text{Equation (7)}$$

The calculation method for calculating the distance Ds is not limited to this method, and may be a method for determining the minimum value of the distances Ds1 to DsN as the distance Ds.

Next, the area difference Av between the main object and the background object is calculated. The area of each object is the number of pixels included in the object. When the area of the object serving as the main object is Av1 and the area of the background object is Av2, the area difference Av can be calculated by Equation (8).

$$Av = Av2 - Av1 \qquad \text{Equation (8)}$$

The area difference Av is calculated from the difference between the areas Av1 and Av2, but may be calculated using the ratio between the areas Av1 and Av2 as illustrated in Equation (9).

$$Av = Av2/Av1 \qquad \text{Equation (9)}$$

It can be guessed that the greater the value of the area difference Av is, the greater the degree of influence of the contrast of the background object to the main object is.

The method for calculating the area difference Av will be described using as an example a case where there is a plurality of (N) combinations of two objects selected from among the objects acquired by the object acquisition unit 2. Differences in area Av1, Av2, . . . , AvN are calculated for the respective combinations. The average value of the differences in area Av1 to AvN is then determined to be the area difference Av as illustrated in Equation (10).

$$Av = (Av1 + Av2 + \ldots, AvN)/N \qquad \text{Equation (10)}$$

The calculation method for calculating the area difference Av is not limited to this method, and may be a method for determining a maximum value of the differences in area Av1 to AvN as the area difference Av.

Next, the contrast intensity Vc is calculated from the calculated luminance difference Yv, distance Ds, and area difference Av using Equation (11). In Equation (11), $\alpha$, $\beta$, and $\gamma$ represent weight coefficients.

$$Vc = \alpha \cdot Yv + \beta \cdot (1/Ds) + \gamma \cdot Av \qquad \text{Equation (11)}$$

As the weight coefficients $\alpha$, $\beta$, and $\gamma$, the values of the differences between the degrees of influence of the luminance difference Yv, the distance Ds, and the area difference Av on a person may be obtained by experiment and set, or a value that influences the contrast the most may be set. For example, if the weight coefficients α, β, and γ are set to α=1, β=0, and γ=0, this means that the luminance difference Yv is used to calculate the contrast intensity Vc. In this case, it is not necessary to calculate the distance Ds and the area difference Av, and thus, it is possible to reduce the load of calculation. In Equation (11), the term of the distance Ds takes the multiplicative inverse. This derives from the tendency that the smaller the distance Ds is, the greater the degree of influence of the contrast is. Thus, the distance Ds takes the multiplicative inverse so that the smaller the distance Ds is, the greater the contrast intensity Vc is. Not only the method in which the multiplicative inverse is taken, but also any method by which a smaller distance Ds is obtained with a greater contrast intensity Vc may be used. For example, a maximum value that can be taken by the distance Ds may be Dsmax, and (Dsmax−Ds) may be used.

(Generation Method for Generating Dynamic Range Compression Curve)

In step S105, using the contrast intensity Vc calculated in step S104, the dynamic range compression curve generation unit 5 generates a dynamic range compression curve.

Figure 10A:
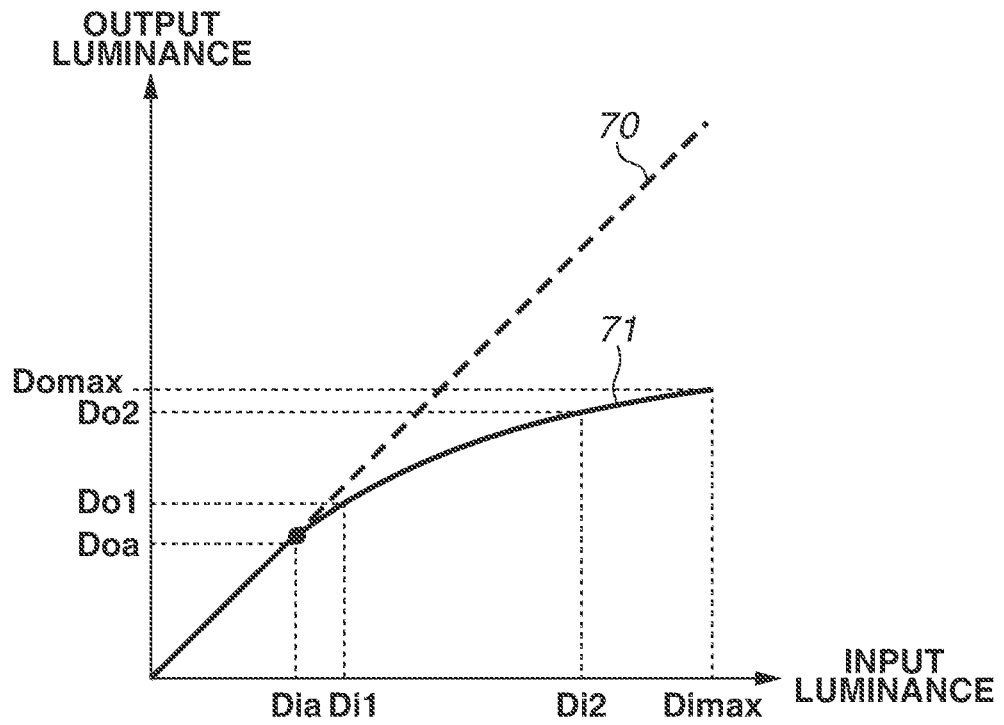
FIGS. 10A and 10B are diagrams illustrating a generation method for generating a D-range compression curve.
Figure 10B:
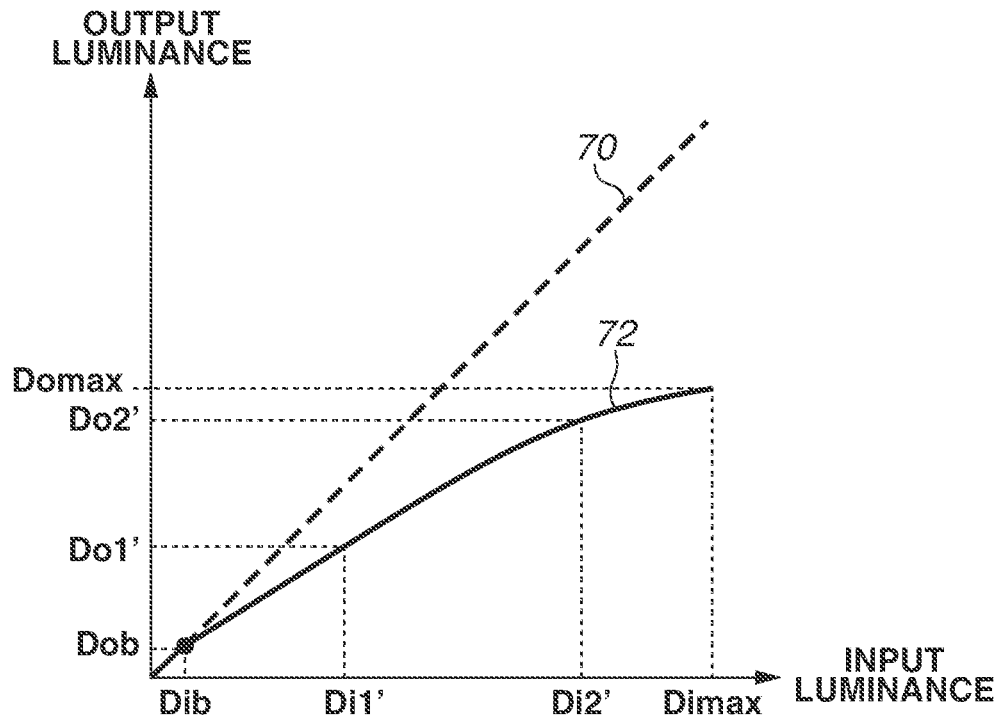

FIGS. 10A and 10B are diagrams illustrating curves for compressing the input luminance into the dynamic range of the output luminance. FIG. 10A illustrates a dynamic range compression curve 71 in a case where the contrast intensity Vc is a first value. FIG. 10B illustrates a dynamic range compression curve 72 in a case where the contrast intensity Vc is a second value greater than the first value. The highest luminance of an input dynamic range is represented by Dimax, and the highest luminance of an output dynamic range is represented by Domax. In the present exemplary embodiment, Dimax is a maximum luminance of an HDR image, and Dimax=1000 nits. Domax is a maximum luminance of an SDR image, and Domax=100 nits.

In FIG. 10A, a knee point that is an inflection point of the dynamic range compression curve 71 is represented by an input luminance Dia and an output luminance Doa, and Dia=Doa. Similarly, in FIG. 10B, a knee point that is an inflection point of the dynamic range compression curve 72 is represented by an input luminance Dib and an output luminance Dob, and Dib=Dob. In FIG. 10A, the input luminance of the main object is represented by Di1, and the output luminance of the main object is represented by Do1. The input luminance of the background object is represented by Di2, and the output luminance of the background object is represented by Do2. Similarly, in FIG. 10B, the input luminance of the main object is represented by Di1', and the output luminance of the main object is represented by Do1'. The input luminance of the background object is represented by Di2', and the output luminance of the background object is represented by Do2'. A dotted line 70 indicates a line where the input luminance and the output luminance are equal to each other.

In the present exemplary embodiment, a dynamic range compression curve is created to compress the luminance range from the input luminance Dia or Dib to the input luminance Dimax into the luminance range from the output luminance Doa or Dob to the output luminance Domax. The dynamic range compression curve is set so that Dia>Dib is obtained.

In FIGS. 10A and 10B, $$Do2' - Do1' > Do2 - Do1$$

In other words, the dynamic range compression curve is set so that the greater the luminance contrast is, the greater the difference in output luminance is.

Figure 11:
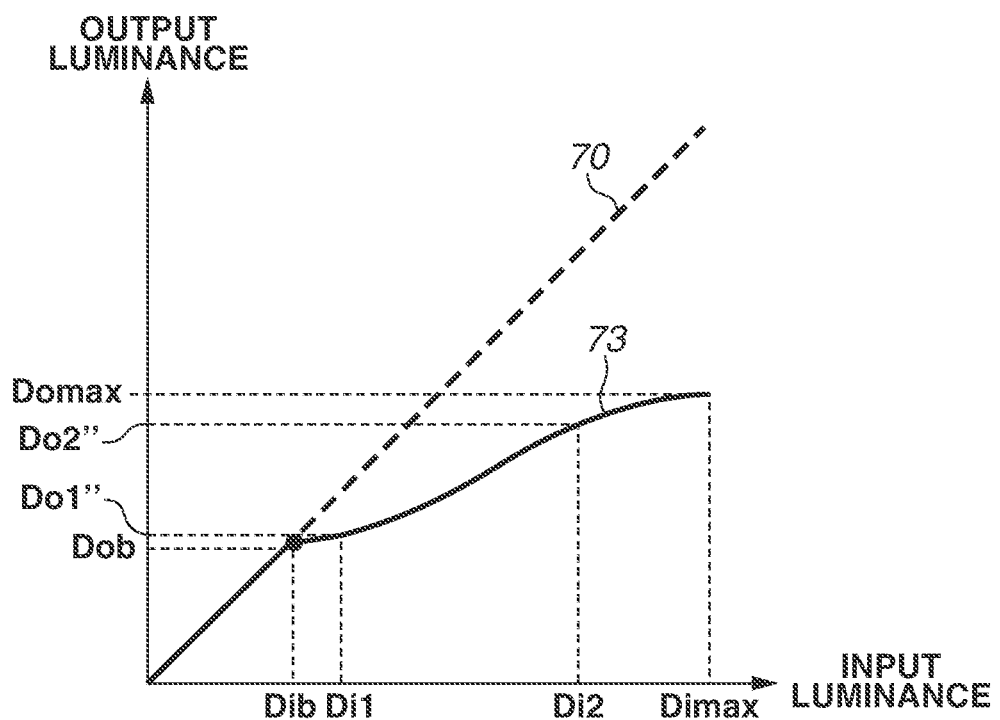
FIG. 11 is a diagram illustrating another example of the generation method for generating the D-range compression curve.

The generation method for generating the dynamic range compression curve is not limited to the above method. For example, a method for setting the curve shape of the dynamic range compression curve as illustrated in FIG. 11 may be used. FIG. 11 is a diagram illustrating the dynamic range compression curve in a case where the contrast intensity Vc is relatively great. In FIG. 11, the input luminance Dib that is a knee point has the same value as the input luminance Dia in FIG. 10A, and Dib=Dia. If the contrast intensity Vc is great, the shape of the dynamic range compression curve of the luminance range from the input luminance Dib to the input luminance Dimax is set to an S-shape. This can make the difference in luminance between output luminances Do1" and Do2" greater than that in a case where the contrast intensity Vc is relatively small. The shape of the curve is not limited to an S-shape. The shape of the curve may have a shape with which a greater contrast intensity Vc is obtained as a difference in luminance between the output luminances Do1" and Do2" increases. A method for setting the dynamic range compression curve using the above method for controlling the knee point and the above method for controlling the curve shape in combination may be used. The method for generating the dynamic range compression curve is not limited to a method for generating the dynamic range compression curve with respect to each image. A form may be employed in which a plurality of dynamic range compression curves is held in the RAM 203 or a memory such as a ROM (not illustrated), and a dynamic range compression curve is selected from among these candidates according to the contrast intensity. Interpolation calculation may be performed on the plurality of dynamic range compression curves, thus newly generating a dynamic range compression curve to be used in subsequent processing.

In step S106, using the dynamic range compression curve generated in step S105, the dynamic range compression unit 6 compresses the dynamic range of the luminance of the HDR image data acquired in step S101, thus generating SDR image data.

In step S107, the image output unit 7 outputs the SDR image data generated by compressing the dynamic range in step S106 as image data to be displayed on the SDR display 211. As a conversion method from YCbCr to RGB, YCbCr can be converted to RGB using the following Equations (12) to (14).

$$R = Y + 1.402 \cdot Cr \qquad \text{Equation (12)}$$

$$G = Y - 0.344 \cdot Cb - 0.714 \cdot Cr \qquad \text{Equation (13)}$$

$$B = Y + 1.772 \cdot Cb \qquad \text{Equation (14)}$$

As described above, in the present exemplary embodiment, a dynamic range compression curve is generated so that the greater the value of the contrast intensity Vc is, the greater the difference in output luminance between a main object and a background object is. SDR image data is generated from HDR image data based on the generated dynamic range compression curve. This can bring the appearance of an SDR image output based on SDR image data having a narrow dynamic range when the SDR image is observed close to the appearance of an HDR image having a wide dynamic range when the HDR image is observed.

In the present exemplary embodiment, an example has been described where the SDR image is displayed on the SDR display 211 in step S102. The SDR image, however, is displayed not only on a display, but also on any output device so long as the output device outputs an SDR image having a narrower dynamic range than that of an HDR image. For example, the SDR image may be displayed on the recording apparatus 210. It is clear that the dynamic range of an image recorded on a recording medium such as paper by a recording apparatus such as a printer is narrower than that of an HDR image.

A method for displaying the SDR image on the display portion 20 of the HDR display 208 may be used. In the display portion 20 of the HDR display 208, an SDR display region such as a window for displaying the luminance range of SDR in a simulated manner may be set, and the SDR image may be displayed in the SDR display region. In this case, the SDR display 211 is unnecessary, and therefore, it is possible to reduce hardware cost.

Figure 12:
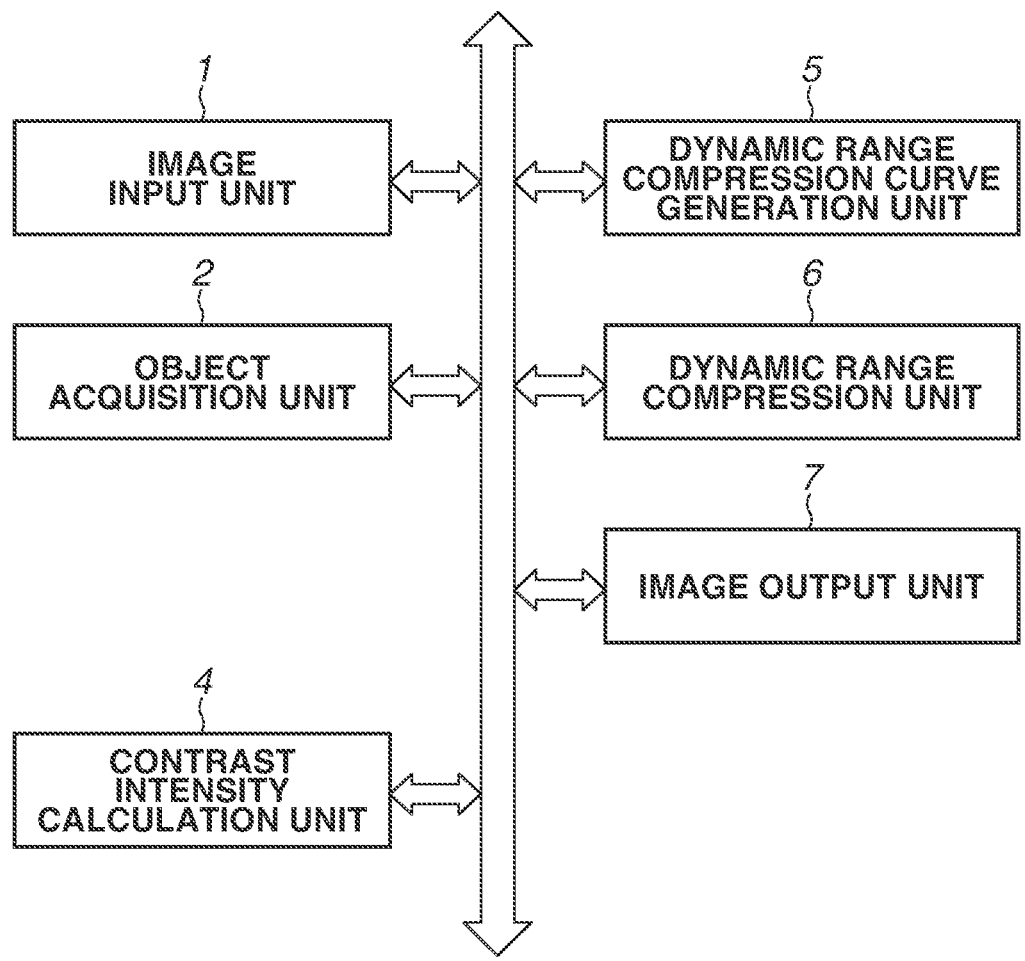
FIG. 12 is a diagram illustrating a software configuration regarding a D-range compression process according to a second exemplary embodiment.
Figure 13:
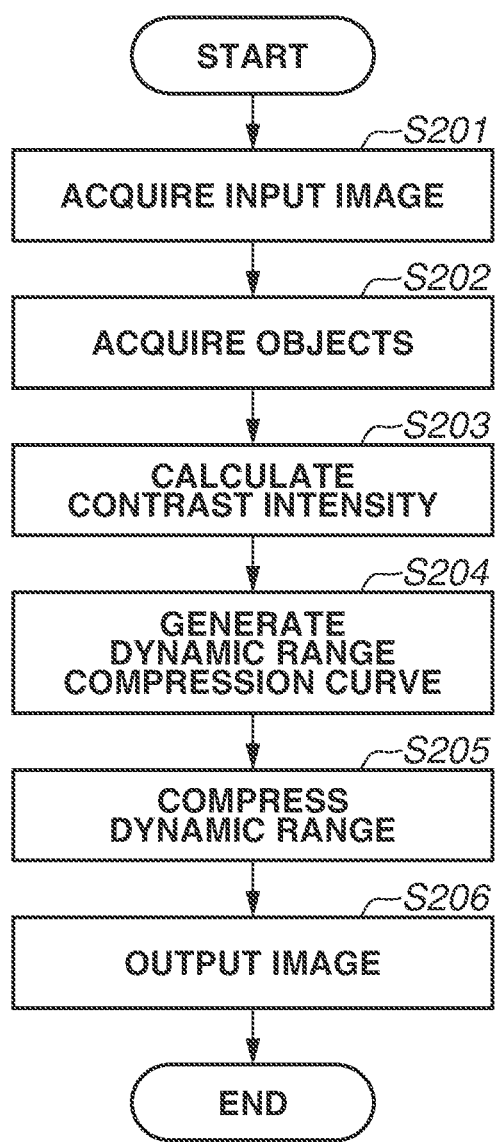
FIG. 13 is a flowchart illustrating the D-range compression process according to the second exemplary embodiment.

Next, a second exemplary embodiment will be described with reference to a block diagram in FIG. 12 and a flowchart in FIG. 13. In the present exemplary embodiment, a main object and a background object are set from an input image.

In step S201, as in step S101, the image input unit 1 acquires HDR image data.

Figure 14:
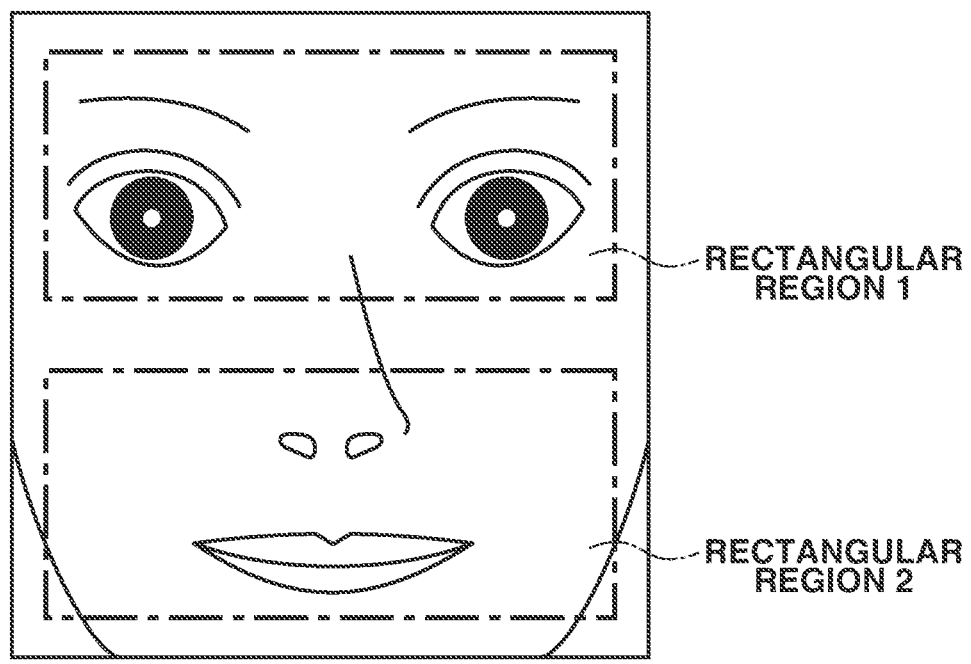
FIG. 14 is a diagram illustrating an example where rectangular regions to be analyzed are set in a weak discriminator according to the second exemplary embodiment.
Figure 15:
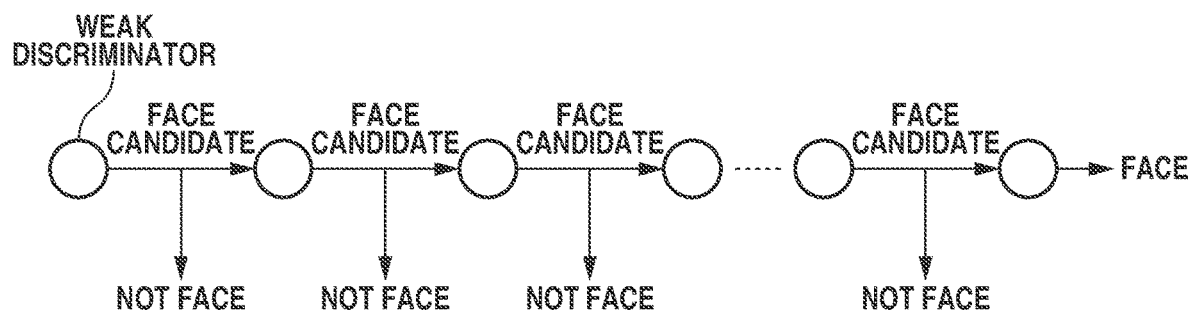
FIG. 15 is a diagram illustrating an example where a strong discriminator is implemented by connecting weak discriminators in series according to the second exemplary embodiment.

In step S202, based on the HDR image acquired in step S201, the object acquisition unit 2 extracts a main object and a background object from the HDR image. In the present exemplary embodiment, the face of a person is set to the main object. A description will be provided taking as an example a case where AdaBoost, which is widely known, is used as an algorithm for detecting the face of a person from the HDR image. AdaBoost is a technique for connecting many weak discriminators in series, thus designing a strong discriminator. In each weak discriminator, Haar-like rectangular feature amounts are set. For illustrative purposes, as illustrated in FIG. 14, the Haar-like rectangular feature amounts are set so that a single weak discriminator analyzes two rectangular regions. The weak discriminator analyzes the rectangular feature amount of each rectangular region, and if the relationship between the feature amounts is the same as a result of prior learning, an evaluation value is added. The rectangular feature amounts to be analyzed differ among weak discriminators. As illustrated in FIG. 15, the weak discriminators are connected in series, thus implementing a single strong discriminator (i.e., detector).

A description has been provided using AdaBoost as an example of a face detector. Alternatively, another face detector such as neural network may be used. As the method for dividing image data into a plurality of regions, SLIC is used. The regions divided by SLIC and the position of the face detected by AdaBoost are associated with each other, thus setting a face object. If there is a plurality of detected faces, a plurality of face objects may be set. Among the regions divided by SLIC, a region different from the face region and having the highest luminance is set to the background object. As the method for calculating the luminance of each region, a method for calculating the luminance from the average luminance of the region, or a method for calculating the luminance from the maximum value of the region may be used. The background object may be set by combining the distance from the face region, the size of the region of the background object, and the luminance of the region of the background object. For example, a region that is at a close distance from the face region, has a large size, and has a high luminance is set to the background object.

(Calculation Method for Calculating Contrast Intensity Vc)

In step S203, based on the information regarding the main object and the background object acquired by the object acquisition unit 2 in step S202 and the HDR image data acquired in step S201, the contrast intensity calculation unit 4 calculates a contrast intensity Vc indicating the intensity of the contrast. In a case where the HDR image data is RGB data, the RGB data can be converted to YCbCr data using the above Equations (1) to (3). The conversion formulas from RGB to YCbCr are merely examples, and other conversion formulas may be used.

The luminance of the main object is represented by a luminance Y1, and the luminance of the background object is represented by a luminance Y2. The luminances Y1 and Y2 are average values calculated from the luminance values of pixels of the respective objects. Instead of the average values, a luminance histogram of each object may be calculated, and a maximum luminance in the histogram may be determined as the luminance. A luminance difference Yv is calculated from the luminances Y1 and Y2 using Equation (4). The luminance difference Yv may be calculated using the ratio between the luminances Y1 and Y2 as illustrated in Equation (5). As described above, it can be assumed that the greater the value of the luminance difference Yv is, the greater the degree of influence of the contrast of the background object to the main object is.

Next, the method for calculating the luminance difference Yv will be described using as an example a case where a plurality of face objects (N face objects in this case) is acquired by the object acquisition unit 2. The differences in luminance calculated regarding the respective combinations of each of the N face objects and the background object are represented by luminance differences Yv1, Yv2, . . . , YvN. The average value of the luminance differences Yv1 to YvN is the luminance difference Yv as indicated by Equation (6).

The luminance difference Yv may be a maximum value of the differences in luminance Yv1 to YvN.

Next, a description will be provided of a method for calculating a distance Ds in a case where there are N face objects.

As in the method described in step S104, the calculation method for calculating the distance Ds is similar to the method for calculating the shortest distance between the objects or the method for calculating the distance between the centers of gravity of the objects, and thus a description thereof is omitted. Distances calculated for the respective combinations of each of the N face objects and the background object are represented by distances Ds1, Ds2, . . . , DsN. The average value of the distances Ds1 to DsN is then determined to be the distance Ds as indicated by Equation (7). The distance Ds may be a minimum value of the distances Ds1 to DsN. It can be assumed that the smaller value the distance Ds takes, the greater the degree of influence of the contrast of the background object to the face object is.

Next, a description will be provided of a method for calculating an area difference Av in a case where there are N face objects. As in the method described in step S104, the calculation method for calculating the area difference Av may be a method in which the difference between each face object and the background object are calculated, or may be a method in which the ratio between each face object and the background object are determined. The average of differences in area Av1, Av2, . . . , AvN regarding the respective N combinations of each face object and the background object is determined as the area difference Av using Equation (10). Alternatively, a method in which a maximum value of the differences in area Av1 to AvN is determined to be the area difference Av may be used.

The contrast intensity Vc is calculated using Equation (11) as in step S104. As the weight coefficients α, β, and γ, the values of the differences between the degrees of influence of the luminance difference Yv, the distance Ds, and the area difference Av on a person may be obtained by experiment and set, or a value that influences the contrast the most may be set. For example, if the weight coefficients α, β, and γ are set to α=1, β=0, and γ=0, this means that the luminance difference Yv is used to calculate the contrast intensity Vc. In this case, it is not necessary to calculate the distance Ds and the area difference Av, and thus, it is possible to reduce the load of calculation.

(Generation Method for Generating Dynamic Range Compression Curve)

In step S204, using the contrast intensity Vc calculated in step S203, the dynamic range compression curve generation unit 5 generates a dynamic range compression curve. The generation method for generating the dynamic range compression curve is similar to that in step S105, and thus a description thereof is omitted.

In step S205, using the dynamic range compression curve generated in step S204, the dynamic range compression unit 6 compresses the dynamic range of the luminance of the HDR image data acquired in step S201, thus generating SDR image data.

In step S206, the image output unit 7 outputs the SDR image data generated by compressing the dynamic range in step S205 as image data to be displayed on the SDR display 211. As a conversion method from YCbCr to RGB, YCbCr can be converted to RGB using Equations (12) to (14).

In the present exemplary embodiment, a dynamic range compression curve is generated so that the greater the value of the contrast intensity Vc is, the greater the difference in output luminance between a face object and a background object is, as described above. The SDR image data is then generated from HDR image data, based on the generated dynamic range compression curve. This can bring the appearance of an SDR image output based on SDR image data having a narrow dynamic range when the SDR image is observed close to the appearance of an HDR image having a wide dynamic range when the HDR image is observed. In the present exemplary embodiment, since the face object and the background object are set from an input image, it is possible to reduce the load related to the creation of display data for setting objects.

(Other Exemplary Embodiments)

In the above exemplary embodiments, the contrast intensity Vc calculated in step S105 is set so that the greater the influence of luminance contrast is, the greater the value of the contrast intensity Vc is. The aspect of the embodiments, however, is not limited to this. The contrast intensity Vc may be set so that the greater the influence of luminance contrast is, the smaller the value of the contrast intensity Vc is. In this case, contrary to the above example, in order to indicate that the influence of luminance contrast increases as the value of the contrast intensity Vc decreases, the dynamic range compression curve may be generated so that the difference in output luminance between the main object and the background object is increase.

In the above exemplary embodiments, an example has been described where the flow of the image processing described in conjunction with FIG. 5 is implemented by reading a program from the RAM 203 or a ROM (not illustrated) of the image processing apparatus 201, and by the CPU 202 executing the program. Alternatively, a mode may be employed in which a program stored in other storage mediums is read and is executed by a computer.

According to the aspect of the embodiments, it is possible to reduce the difference between the appearance of an output based on input image data having a wide luminance range when the output is observed and the appearance of an output based on output image data having a narrow luminance range when the output is observed.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-028709, filed Feb. 25, 2021, which is hereby incorporated by reference herein in its entirety.

What is claimed is:

1. An apparatus comprising:
an acquisition unit configured to acquire information indicating a first object and a second object among a plurality of objects included in input data having a first range;
a calculation unit configured to calculate, based on the acquired information, an intensity indicating a degree of contrast between a brightness of the first object and a brightness of the second object; and
a generation unit configured to generate output data having a second range narrower than the first range by converting luminance values of pixels in the input data, based on the calculated intensity,
wherein, in a case where the calculated intensity is a first intensity, the generation unit generates the output data so that a difference between a luminance of the first object and a luminance of the second object in the output data is a first value, and wherein, in a case where the calculated intensity is a second intensity indicating that influence of contrast is greater than influence of contrast of the first intensity, the generation unit generates the output data so that the difference between the luminance of the first object and the luminance of the second object in the output data is a second value greater than the first value.

2. The apparatus according to claim 1, wherein a value indicated by the first intensity is greater than a value indicated by the second intensity.

3. The apparatus according to claim 2, wherein the greater the difference between the luminance of the first object and the luminance of the second object is, the greater a value of the calculated intensity is.

4. The apparatus according to claim 1, wherein the calculation unit calculates the intensity further based on a distance between the first object and the second object.

5. The apparatus according to claim 4,
wherein the calculated intensity is a sum of a plurality of terms including a term based on the difference between the luminance of the first object and the luminance of the second object and a term based on the distance, and
wherein the greater the distance is, the smaller the term based on the distance is.

6. The apparatus according to claim 1, wherein the calculation unit calculates the intensity further based on an area difference between an area of the first object and an area of the second object.

7. The apparatus according to claim 6,
wherein the calculated intensity is a sum of a plurality of terms including a term based on the difference between the luminance of the first object and the luminance of the second object and a term based on the area difference, and
wherein the greater the area difference is, the greater the term based on the area difference is.

8. The apparatus according to claim 1, wherein the generation unit generates the output data using a dynamic range compression curve that defines a value to be output for an input value.

9. The apparatus according to claim 8, further comprising a memory configured to hold a plurality of dynamic range compression curves,
wherein, based on the calculated intensity, the generation unit selects a dynamic range compression curve to be used to generate the output data, from among the dynamic range compression curves.

10. The apparatus according to claim 1, further comprising a reception unit configured to receive an operation from a user,
wherein the acquisition unit acquires the information from the user through the reception unit.

11. The apparatus according to claim 1, wherein, based on the input data, the acquisition unit sets a person object to the first object and sets a background object to the second object.

12. The apparatus according to claim 1, wherein the calculation unit sets a person object to the first object and sets a background object to the second object.

13. A method comprising:
acquiring information indicating a first object and a second object among a plurality of objects included in input data having a first range;
calculating, based on the acquired information, an intensity indicating a degree of contrast between a brightness of the first object and a brightness of the second object; and
generating output data having a second range narrower than the first range by converting values of pixels in the input data, based on the calculated intensity,
wherein, in a case where the calculated intensity is a first intensity, the output data in which a difference between a luminance of the first object and a luminance of the second object is a first value is generated, and
wherein, in a case where the calculated intensity is a second intensity indicating that influence of contrast is greater than influence of contrast of the first intensity, the output data in which the difference between the luminance of the first object and the luminance of the second object is a second value greater than the first value is generated.

14. The method according to claim 13, wherein a value indicated by the first intensity is greater than a value indicated by the second intensity.

15. The method according to claim 13, wherein the calculation unit calculates the intensity further based on a distance between the first object and the second object.

16. A non-transitory computer-readable storage medium storing a program for causing a computer to perform each process of a method, the method comprising:
acquiring information indicating a first object and a second object among a plurality of objects included in input data having a first range;
calculating, based on the acquired information, an intensity indicating a degree of contrast between a brightness of the first object and a brightness of the second object; and
generating output data having a second range narrower than the first range by converting values of pixels in the input data, based on the calculated intensity,
wherein, in a case where the calculated intensity is a first intensity, the output data in which a difference between a luminance of the first object and a luminance of the second object is a first value is generated, and
wherein, in a case where the calculated intensity is a second intensity indicating that influence of contrast is greater than influence of contrast of the first intensity, the output data in which the difference between the luminance of the first object and the luminance of the second object is a second value greater than the first value is generated.

17. The non-transitory computer-readable storage medium according to claim 16, wherein a value indicated by the first intensity is greater than a value indicated by the second intensity.

18. The non-transitory computer-readable storage medium according to claim 16, wherein the calculation unit calculates the intensity further based on a distance between the first object and the second object.

19. An apparatus comprising:
an acquisition unit configured to acquire information indicating a first object and a second object among a plurality of objects included in input data having a first range; and
a generation unit configured to generate output data having a second range narrower than the first range by converting values of pixels in the input data, based on the acquired information,
wherein, in a case where a difference between a luminance of the first object and a luminance of the second object in the input data is a first value, the generation unit generates the output data so that a difference between a luminance of the first object and a luminance of the second object in the output data is a second value, and wherein, in a case where the difference between the luminance of the first object and the luminance of the second object in the input data is a third value greater than the first value, the generation unit generates the output data so that the difference between the luminance of the first object and the luminance of the second object in the output data is a fourth value greater than the second value.

* * * * *